(12) United States Patent
Bonneau et al.

(10) Patent No.: US 10,487,689 B2
(45) Date of Patent: Nov. 26, 2019

(54) TURBINE CASING COMPRISING RING SECTOR ATTACHMENT MEANS

(75) Inventors: Damien Bonneau, Melun (FR); Jean-Christophe Marc Cordier, Bois-le-Roi (FR); Fabrice Marcel Noel Garin, Boissise la Bertrand (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 640 days.

(21) Appl. No.: 14/003,490

(22) PCT Filed: Mar. 6, 2012

(86) PCT No.: PCT/FR2012/050455
§ 371 (c)(1),
(2), (4) Date: Sep. 6, 2013

(87) PCT Pub. No.: WO2012/120228
PCT Pub. Date: Sep. 13, 2012

(65) Prior Publication Data
US 2014/0003924 A1    Jan. 2, 2014

(30) Foreign Application Priority Data

Mar. 7, 2011  (FR) .................................... 11 51802

(51) Int. Cl.
*F01D 25/24*  (2006.01)
*F01D 11/24*  (2006.01)

(52) U.S. Cl.
CPC .............. *F01D 25/24* (2013.01); *F01D 11/24* (2013.01); *F01D 25/246* (2013.01);
(Continued)

(58) Field of Classification Search
CPC .......... F01D 11/14; F01D 11/20; F01D 11/24; F01D 11/00; F01D 25/24; F01D 25/246; F01D 25/08; F01D 25/12; F01D 25/14
See application file for complete search history.

(56) References Cited

U.S. PATENT DOCUMENTS

| 4,337,016 A * | 6/1982 | Chaplin | ................. F01D 11/08 415/116 |
| 4,565,492 A * | 1/1986 | Bart | ....................... F01D 11/18 415/116 |

(Continued)

FOREIGN PATENT DOCUMENTS

| EP | 1 903 186 | 3/2008 |
| EP | 2 053 200 | 4/2009 |

OTHER PUBLICATIONS

U.S. Appl. No. 13/520,433, filed Jul. 3, 2012, 2012-0308391, Garin, et al.
(Continued)

*Primary Examiner* — Carlos A Rivera
*Assistant Examiner* — Cameron A Corday
(74) *Attorney, Agent, or Firm* — Oblon, McClelland, Maier & Neustadt, L.L.P.

(57) ABSTRACT

An aircraft turbine casing configured to carry a set of ring sectors that partly delimits a conduit inside which a gas flow passes through the turbine, including a dynamic mechanism adjusting radial position of ring sectors, an upstream radial lug that connects an upstream end of each ring sector to the casing, and a downstream radial lug that connects a downstream end of each ring sector to the casing. The upstream lug is made as a single piece with the casing and is directly connected to the upstream end of each ring sector.

7 Claims, 3 Drawing Sheets

(52) U.S. Cl.
CPC .... *F05D 2240/11* (2013.01); *F05D 2260/201* (2013.01); *F05D 2260/205* (2013.01); *Y02T 50/671* (2013.01); *Y02T 50/676* (2013.01)

(56) References Cited

U.S. PATENT DOCUMENTS

| | | | | |
|---|---|---|---|---|
| 4,642,024 | A | * | 2/1987 | Weidner .................. F01D 11/08 |
| | | | | 415/116 |
| 5,238,365 | A | * | 8/1993 | Petsche ..................... F01D 9/00 |
| | | | | 415/170.1 |
| 8,025,483 | B2 | | 9/2011 | Blanchard et al. |
| 8,070,445 | B2 | | 12/2011 | Blanchard et al. |
| 8,100,635 | B2 | * | 1/2012 | Dakowski ............. F01D 11/005 |
| | | | | 415/115 |
| 8,402,770 | B2 | | 3/2013 | Garin et al. |
| 8,757,966 | B2 | | 6/2014 | Blanchard et al. |
| 8,864,458 | B2 | | 10/2014 | Blanchard et al. |
| 2008/0075584 | A1 | | 3/2008 | Philippot |
| 2009/0104026 | A1 | | 4/2009 | Dakowski et al. |
| 2012/0308391 | A1 | | 12/2012 | Garin et al. |

OTHER PUBLICATIONS

U.S. Appl. No. 14/449,308, filed Aug. 1, 2014, Garin, et al.
International Search Report dated May 3, 2012 in PCT/FR12/050455 filed Mar. 6, 2012.

* cited by examiner

TURBINE CASING COMPRISING RING SECTOR ATTACHMENT MEANS

TECHNICAL FIELD

The invention discloses a turbine machine casing comprising ring sector attachment means.

More particularly, the invention discloses a casing for which ring sectors are fixed so as to limit ring sector cooling air leaks.

STATE OF PRIOR ART

In an aircraft turbine machine, the radial position of the tip of high pressure turbine blades varies as a function of the turbine machine operating conditions, particularly because the blades expand by a variable amount because they are heated by combustion gases and also because the turbine machine rotation speed causes a variable elongation of the blades due to centrifugal action.

The blades of the high pressure turbine are arranged in a flow path in the turbine delimited by an outer ring formed by a plurality of adjacent ring sectors. The tips of the blades move close to the inner face of each ring sector.

Since the radial position of the tip of each blade varies as a function of operating conditions of the turbine machine, the radial clearance between the tip of each blade and the ring sectors also varies.

If this clearance is too high, gases tend to form vortices at the tip of each blade, which makes the turbine machine less efficient. If the clearance is too small, the tip of a blade can come into contact with a ring sector and damage it.

Each ring sector is supported by an external casing of the turbine machine that is made so that the extent of this radial clearance can be controlled.

To achieve this, the casing comprises bumps over which an air flow is forced at a temperature lower than the casing temperature to cool the casing and cause radial contraction of the casing. This contraction of the casing reduces the diameters of the casing and the ring, thus reducing the radial clearance between the blade tips and the ring sectors.

The casing is usually called the "piloting casing".

The connection between ring sectors and the casing is made through radial spacers fixed firstly to the casing and secondly to the ring sectors.

Such a ring sector attachment mode is disclosed for example in EP 1.903.186.

Each spacer extends around an angular sector and each is fixed to two associated ring sectors.

Since the spacers are fixed to the piloting casing, they are free to move in the radial direction to enable radial displacement of the ring sectors. There is also a functional clearance between two adjacent spacers.

However, due to the clearance between the spacers, air used to cool the ring sectors can escape through this clearance to reach the high pressure turbine flow path, thus reducing the efficiency of the high pressure turbine and the turbine machine.

Furthermore, installation of spacers on the piloting casing is relatively complex and the mass of the spacers reduces the general performance of the turbine machine.

The purpose of this invention is to disclose a turbine machine casing that solves the above problems.

PRESENTATION OF THE INVENTION

The invention discloses an aircraft turbine casing designed to carry a set of ring sectors that partly delimits a conduit inside which a gas flow passes through the turbine, the casing comprising dynamic means of adjusting the radial position of ring sectors by the controlled injection of an air flow on portions of an annular wall of the casing, the casing comprising an upstream radial lug that connects an upstream end of each ring sector along the flow direction of the gas flow to the casing, and a downstream radial lug that connects a downstream end of each ring sector to the casing, characterised in that at least the upstream radial lug is made as a single piece with the casing and is directly connected to the upstream end of each ring sector.

Such an embodiment of at least one upstream lug can eliminate the attachment means of the upstream lug onto the casing, reducing the weight of the casing and thus limiting risks of leaks.

Preferably, the two radial lugs are made as a single piece with the casing and are directly connected to each ring sector.

Preferably, at least the upstream radial lug comprises air passage orifices for ventilation of the ring sectors.

Preferably, each radial lug is formed from a ring extending radially inwards, in a radial plane relative to the principal axis of the turbine, starting from an inner annular face of the annular wall of the casing.

Preferably, the casing comprises an air flow guide conduit along an inner annular face of the annular wall of the casing.

Preferably, said guide conduit opens up towards the direction of the ring sectors.

Preferably, the orifices in the upstream radial lug open up into said guide conduit.

Preferably, the conduit is radially delimited by the annular wall and by an annular guide plate that is arranged radially between the annular wall and the ring sectors.

The invention also discloses a turbine for an aircraft turbine machine comprising a stator assembly composed of a casing according to the invention composed of a plurality of ring sectors that are directly fixed at least to the upstream radial lug of the casing.

The invention also discloses an aircraft turbine machine comprising a turbine according to the invention, and/or a casing according to the invention.

BRIEF DESCRIPTION OF THE DRAWINGS

Other characteristics and advantages of the invention will become clear after reading the detailed description given below, which will be more easily understood by referring to the appended drawings among which.

DETAILED PRESENTATION OF PARTICULAR EMBODIMENTS

Figure 1:
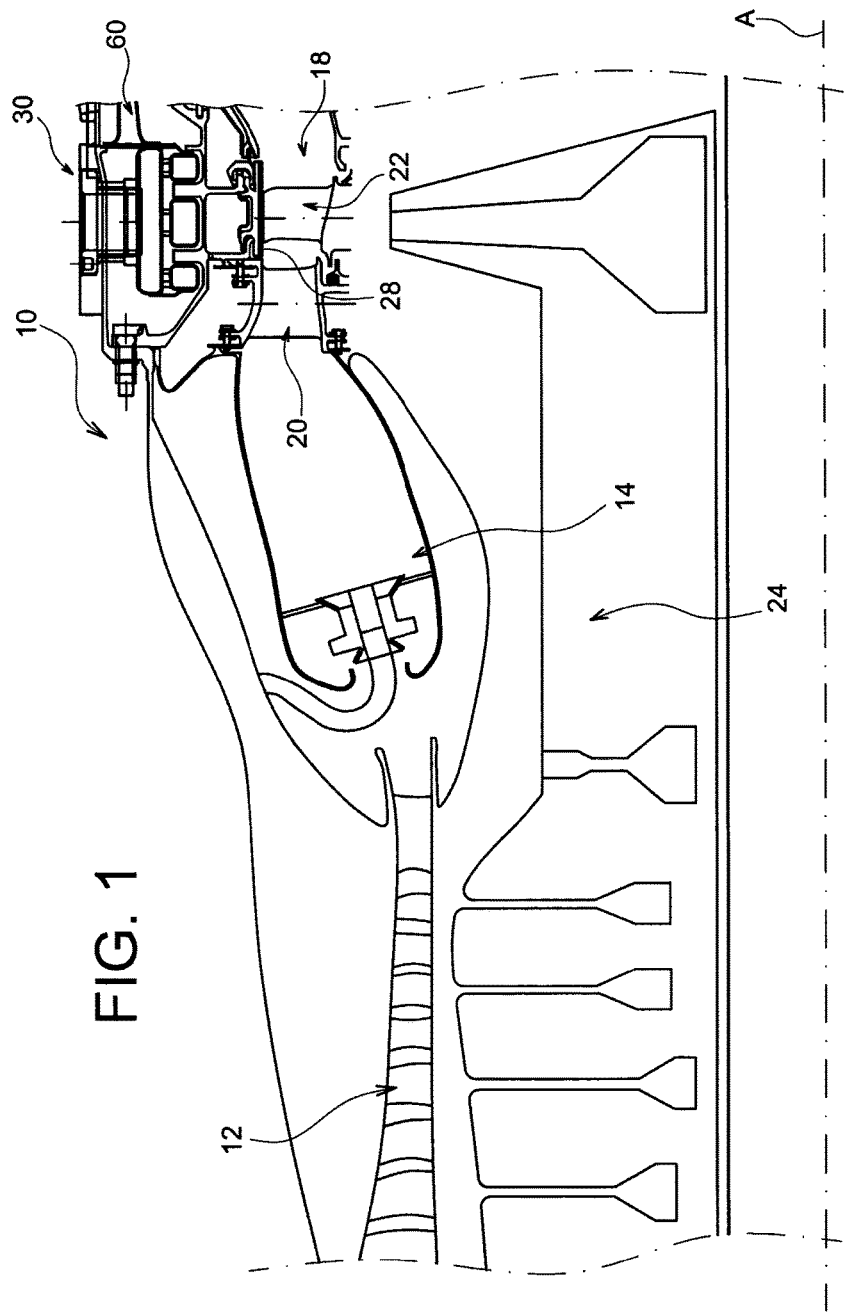
FIG. 1 is a partial axial sectional view of a turbine machine comprising a casing made according to the invention.

FIG. 1 contains a partial view of a turbine machine 10 with principal axis A that comprises a high pressure compressor 12, a combustion chamber 14 and a high pressure turbine in order along the flow direction of the gas flow, in other words in this case from left to right.

The high pressure turbine comprises an annular conduit 18, commonly called the flow path through which gases from the combustion chamber 14 circulate from the upstream to the downstream direction, fixed guide veins 20 and mobile blades 22 positioned in the flow path 18.

The blades 22 are carried by a high pressure body 24 of the high pressure turbine that is free to rotate around the principal axis A of the turbine machine 10 and connects the high pressure turbine to the high pressure compressor 12.

The high pressure turbine comprises a radially outer stator assembly that partly delimits the flow path and that comprises a plurality of adjacent ring sectors 28 that radially delimit the flow path 18.

Figure 2:
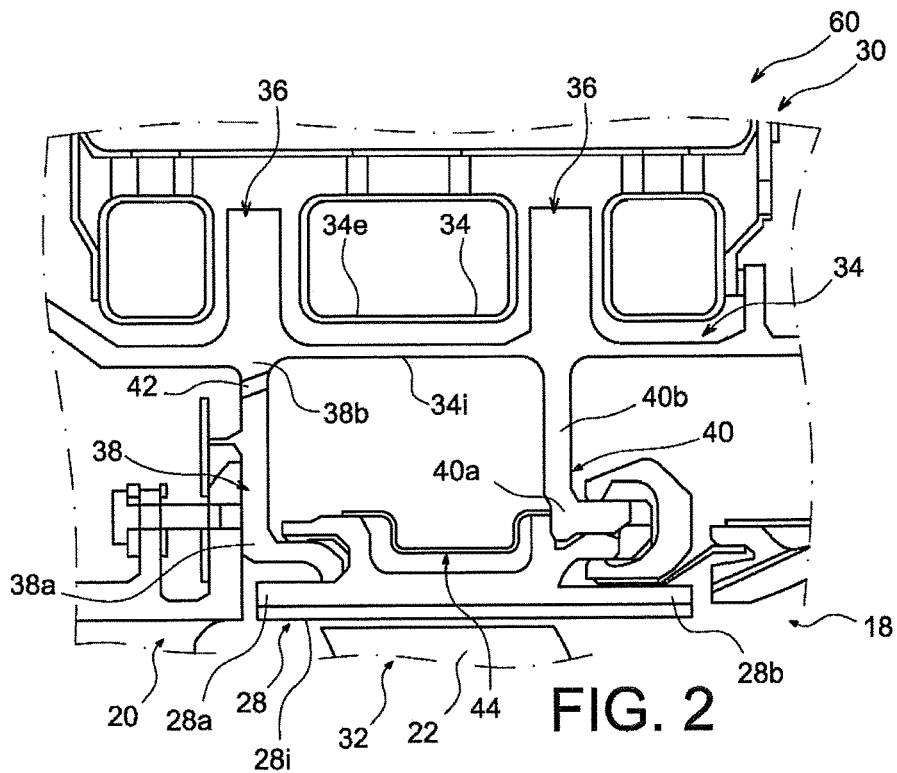
FIG. 2 is a larger scale detail of the piloting casing shown in FIG. 1, in which the two radial lugs are made from a single piece with the casing.

The stator assembly also comprises an outer casing of the high pressure turbine that carries the ring sectors 28, as can be seen in more detail in FIG. 2.

The casing 30 comprises an annular wall 34 located radially at a distance from the ring sectors 28 on the inner face 34*i* of which the ring sectors 28 are mounted.

The casing 30 is also made so as to enable dynamic adjustment of the radial position of the ring sectors 28 relative to the principal axis A of the turbine machine 10, to optimise the radial clearance between the tip 32 of each blade 22 and the inner face 28*i* facing each ring sector 28.

This dynamic adjustment is made depending on operating conditions of the turbine machine 10, and consists principally of injecting an air quantity towards part of the casing 30 in order to contribute to cooling the casing 30 and reduce its expansion.

This is done by drawing off an air quantity in the high pressure compressor 12 and bringing it to the casing 30 through conduits to be injected onto the outer face 34*e* of the annular wall 34.

The drawn off air is injected into a piloting box 60 of the casing 30 that is fixed to the annular wall 34.

The piloting box 60 comprises bumps 36 formed on the outer face 34*e* of the annular wall 34. The bumps 36 are formed to improve heat exchanges with the injected air.

Multiple perforations are formed in the piloting box 60, in other words it comprises a plurality of perforations through which air passes to cool the bumps 36 by impact with air.

The casing 30 is cooled more or less depending on the air quantity injected onto the bumps 36, and the amplitude of its expansion is thus controlled.

The ring sectors 28 are mounted on the wall 34 of the casing 30, therefore they displace radially, following expansion or contraction of the casing 30.

Thus, air projected onto the bumps 36 modifies the radial position of the ring sectors 28 relative to the principal axis A of the turbine machine 10.

Each ring sector 28 is assembled on the piloting casing 30 by means of two radial lugs 38, 40 that extend radially from the annular wall 34 of the piloting casing 30 as far as the ring sector 28.

A first upstream radial lug 38 is located at the upstream end 28*a* of each ring sector 28 along the flow direction of the gas flow, and a second downstream radial lug 40 is located at the downstream end 28*b* of the ring sector 28.

The inner radial end 38*a*, 40*a* of each radial lug 38, 40 is fixed to the associated end 28*a*, 28*b* of the ring sector 28, by conventional attachment means.

The outer radial end 38*b*, 40*b* of each radial lug 38, 40 is fixed to the annular wall 34 of the casing 30.

According to the invention, at least the upstream radial lug 38 is made as a single piece with the annular wall 34 of the casing 30, and according to a preferred embodiment shown in the figures, the two radial lugs 38, 40 are made as a single piece with the annular wall 34 of the casing 30.

Such an embodiment of the radial lugs 38, 40 locally simplifies the structure of the turbine machine 10 by reducing the number of parts. Furthermore, this can limit the weight of the assembly, particularly by elimination of attachment means of the radial lugs 38, 40 to the annular wall 34 of the casing 30.

Furthermore, the radial lugs 38, 40 are fixed relative to the annular wall 34, which eliminates functional clearances and therefore any leaks from an air flow cooling the ring sectors 28.

Each radial lug 38, 40 globally consists of a plane ring that extends in a radial plane relative to the principal axis A of the turbine machine 10.

The upstream radial lug 38 also comprises a plurality of orifices 42 distributed at a uniform angular spacing around the principal axis A of the turbine machine 10.

These orifices 42 are made so as to enable air circulation towards the ring sectors 28 in order to cool them. The ring sectors 28 are in direct contact with hot gases output from the combustion chamber. This cooling of the rings 28 assures long life.

Each ring sector 28 comprises internal orifices (not shown) and carries a U-shaped plate 44 for directing the cooling air from the orifices 42.

According to another aspect of the piloting casing 30, the axial position of each radial lug 38, 40 is in line with a piloting bump 36.

In this case, the casing 30 comprises two piloting bumps 36 that are axially offset from each other.

Thus, the upstream radial lug 38 is located axially in line with the upstream piloting bump 36, and the downstream radial lug 40 is axially in line with the downstream piloting bump 36.

It will be understood that the invention is not limited to this embodiment in which the casing 30 comprises two bumps 36 and that it also relates to embodiments in which there is a different number of bumps. The position of the radial lugs 38, 40 is then adapted so that each radial lug 38, 40 is located at a piloting bump 36.

According to the embodiment shown in FIG. 2, each ring sector 28 is directly facing the annular wall 34 of the casing 30.

As described above, the ring sectors 28 are heated to a high temperature by gases circulating in the flow path 18.

Thus, the ring sectors 28 can heat the annular wall 34 of the casing 30 by radiation.

This heating of the annular wall 34 limits the efficiency of the cooling air projected onto the piloting bumps 36.

Figure 3:
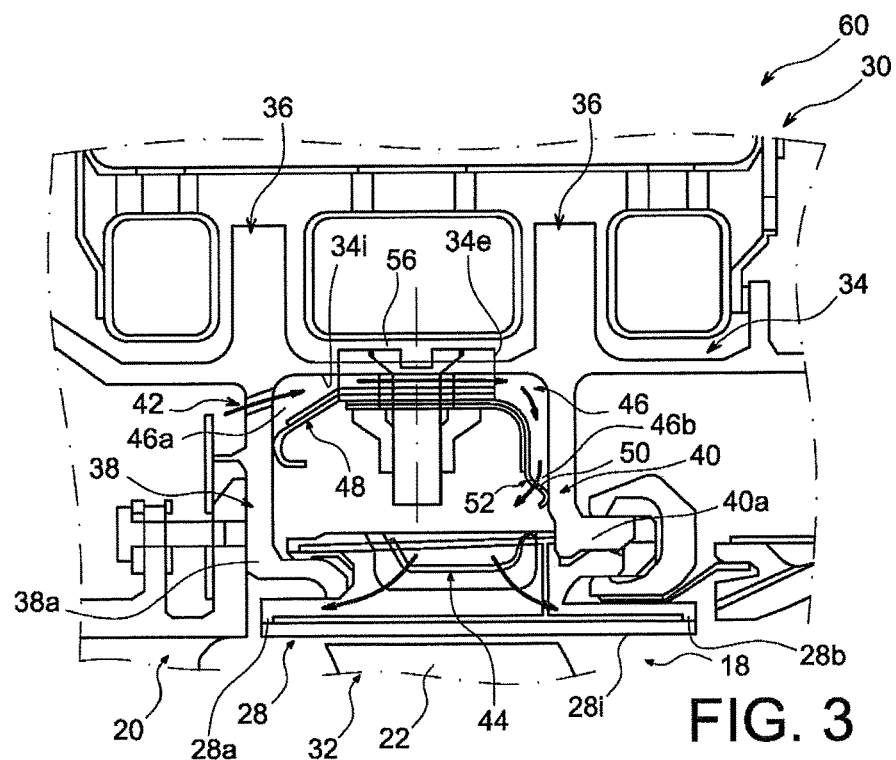
FIG. 3 is a view similar to that of FIG. 2, showing one variant embodiment of the invention comprising an annular guide conduit of a cooling flow for the casing annular wall.
Figure 4:
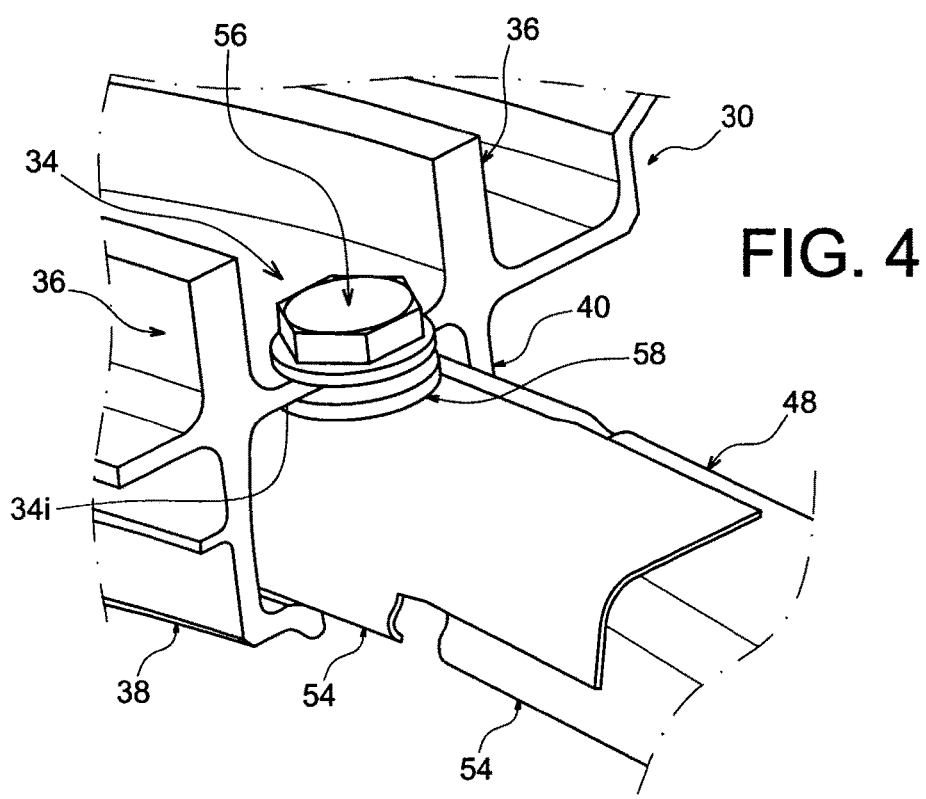
FIG. 4 is a perspective detailed view of the variant shown in FIG. 3, showing the two segments of the annular plate delimiting the annular conduit.

This is why, according to another aspect of the invention shown in FIGS. 3 and 4, the casing 30 comprises an annular conduit 46 to guide an air flow along the inner face 34*i* of the annular wall 34.

The air flow cools the annular wall 34 of the casing as it circulates along the annular wall 34. Thus, the air flow forms a barrier to thermal radiation from the ring sectors 28.

According to one variant embodiment, the air flow that passes through the annular conduit 46 also cools the ring sectors 28.

To achieve this, the upstream end 46*a* of the annular conduit 46 is located in line with the upstream radial lug 38 and the orifices 42 open up into the annular conduit 46. Similarly, the downstream end 46*b* of the annular conduit 46 is located in line with the downstream radial lug 40 and it is made so as to open up in the direction of the ring sectors 28.

Consequently, the air flow globally circulates in the downstream direction in the annular conduit 46 cooling the annular wall 34 of the casing 30, and is then redirected in the radial direction towards the ring sectors 28 to cool them, starting from the downstream end of the annular conduit 46.

According to the embodiment shown in FIGS. 3 and 4, the annular conduit 46 is delimited in the radial direction by the annular wall 34 of the casing 30 and by an annular plate 48 that is arranged radially between the annular wall 34 and the ring sectors 28.

The annular plate 48 is made such that its axial ends are bearing in contact with the faces adjacent to the radial lugs 38, 40, so as to limit air leaks. Preferably, this support is facilitated by elastic deformation of the annular plate 48, which is axially compressed between the two radial lugs 38, 40.

To achieve this, the annular plate 48 is convex outwards in shape, such that the upstream and downstream axial end edges of the annular plate are at least partly oriented in the radial direction towards the principal axis A of the turbine machine 10.

The downstream end edge 50 of the annular plate 48 comprises outlet orifices 52 that are globally oriented towards the U-plate 44 supported by each ring sector 28 and through which the air flow from the annular conduit 46 is redirected towards the ring sectors 28.

As can be seen in FIG. 4, the annular plate 48 is made in several segments 54 each extending on one angular sector, to enable assembly between the two radial lugs 38, 40.

For example, the annular plate is made in three segments each extending over an angular sector of about 120 degrees.

The connection between two adjacent segments 54 is made to enable displacement of the segments relative to each other along a direction perpendicular to a radial plane.

In this case, the link between the associated ends of the two adjacent segments 54 is of the telescopic type, in other words the end of one segment fits into the end of the other segment, and is capable of sliding along the direction perpendicular to the radial plane.

This relative displacement of the segments 54 relative to each other enables a variation of the diameter of the annular plate 48 during control of the clearance between the ring sectors 28 and the vertices of the blades 22, thus preventing the occurrence of mechanical stresses internal to the annular plate 48 or to the piloting casing 30.

In this case the annular plate 48 is fixed to the casing 30 through radial screws 56 that pass through the annular wall 34. A washer 58 associated with each screw radially compressed by the associated radial screw between the annular plate 48 and the annular wall 34 maintains a predefined space corresponding to the annular air passage conduit 46.

The invention that has just been described refers to the stator part of the high pressure turbine of the turbine machine 10 that comprises the casing 30 and the ring sectors 28.

It will be understood that the invention is not limited to the casing 30 and to the high pressure turbine 16, and that the invention also relates to the stator part of the low pressure turbine of the turbine machine 10, that also comprises a casing and similar ring sectors.

The invention claimed is:

1. An aircraft turbine casing configured to carry a set of ring sectors that partly delimits a conduit inside which a gas flow passes through the turbine, comprising:
a dynamic mechanism to adjust a radial position of the ring sectors by controlled injection of an air flow on portions of an annular wall of the casing;
an upstream radial lug that connects an upstream end of each ring sector, along a direction of gas flow to the casing, and a downstream radial lug that connects a downstream end of each ring sector to the casing; and
a guide conduit that is delimited by the upstream radial lug, the downstream radial lug, the annular wall and by an annular guide plate that is in contact with the upstream radial lug and downstream radial lug and is arranged radially between the annular wall and the ring sector;
wherein only the downstream end of the annular plate comprises outlet orifices globally oriented towards the ring sector,
wherein at least the upstream radial lug is made as a single piece with the casing and is directly connected to the upstream end of each ring sector, and
wherein the upstream radial lug includes air passage orifices for ventilation of the ring sectors that open up into the guide conduit.

2. The casing according to claim 1, wherein the upstream and downstream radial lugs are made as a single piece with the casing and are directly connected to each ring sector.

3. The casing according to claim 1, wherein each radial lug is formed from a ring extending radially inwards, in a radial plane relative to a principal axis of the turbine, starting from an inner annular face of the annular wall of the casing.

4. A turbine for an aircraft turbine machine comprising:
a stator assembly including the casing according to claim 1; and
a plurality of ring sectors that are directly fixed at least to the upstream radial lug of the casing.

5. An aircraft turbine machine comprising the turbine according to claim 4.

6. The casing according to claim 1, wherein air exits the guide conduit at a downstream end edge of the annular plate.

7. The casing according to claim 1, wherein the annular plate includes an axially extending section and a radially extending section downstream of the axially extending section, and the downstream end is located further downstream of the radially extending section.

* * * * *